(12) United States Patent
Szalay

(10) Patent No.: US 11,022,227 B2
(45) Date of Patent: Jun. 1, 2021

(54) APPLIANCE END FITTING

(71) Applicant: Schaefer Screw Products Company, Garden City, MI (US)

(72) Inventor: Michael Szalay, Walled Lake, MI (US)

(*) Notice: Subject to any disclaimer, the term of this patent is extended or adjusted under 35 U.S.C. 154(b) by 0 days.

(21) Appl. No.: 16/516,968

(22) Filed: Jul. 19, 2019

(65) Prior Publication Data
US 2020/0056713 A1 Feb. 20, 2020

Related U.S. Application Data

(60) Provisional application No. 62/703,055, filed on Jul. 25, 2018.

(51) Int. Cl.
*F16K 17/38* (2006.01)

(52) U.S. Cl.
CPC ....... *F16K 17/383* (2013.01); *Y10T 137/1797* (2015.04)

(58) Field of Classification Search
CPC ................ F16K 17/383; Y10T 137/1797
See application file for complete search history.

(56) References Cited

U.S. PATENT DOCUMENTS

| | | | | |
|---|---|---|---|---|
| 3,557,818 A | * | 1/1971 | Rohde | G05D 16/0655 137/505.42 |
| 4,590,962 A | * | 5/1986 | Tespa | F16K 17/30 137/460 |
| 5,190,072 A | * | 3/1993 | McAnally | F16K 17/04 137/454.5 |
| 5,477,877 A | * | 12/1995 | Schulze | A62C 4/02 137/457 |
| 6,848,466 B2 | * | 2/2005 | Durand | F16K 1/305 137/15.18 |
| 6,895,952 B1 | * | 5/2005 | Bachelder | A47J 37/0786 126/25 R |
| 2018/0195630 A1 | * | 7/2018 | Lammers | F16K 15/026 |

* cited by examiner

*Primary Examiner* — Kevin R Barss
(74) *Attorney, Agent, or Firm* — The Weintraub Group, P.L.C.

(57) ABSTRACT

An end fitting for use in connecting a gas source in fluid communication to an appliance, includes a nut mounted by a fusible and meltable heat activatable material on a socket having a chamber for receiving a plug. The plug connects to the gas source and the socket connects to the appliance. An O-ring of meltable heat activatable material separates the plug and socket. The socket includes a spring that biases a valve member against the plug and between closed and open conditions, respectively, to block or permit fluid flow from a source and through the chamber. In case of excess heat buildup in the socket body, the heat activatable materials melt but unless the gas source is turned off always allow a predetermined amount of gas to flow.

9 Claims, 3 Drawing Sheets

APPLIANCE END FITTING

CROSS REFERENCE TO RELATED APPLICATION

This application is a completion application which claims the priority benefit of co-pending U.S. Provisional Patent Application Ser. No. 62/703,055, filed Jul. 25, 2018, for "Appliance End Fitting," the disclosure of which is hereby incorporated by reference in its entirety, including the drawing.

BACKGROUND OF THE INVENTION

1. Field of the Invention

The present invention relates to an appliance end fitting for connecting a pressurized gas cylinder with a gas appliance such as a barbecue grill wherein the end fitting incorporates an improved and simplified construction that incorporates control of flow and control of excessive heat.

2. Description of Related Art

Gas appliances such as barbecue grills are connected to pressurized propane or LP gas cylinders by means of an appliance end fitting on the end of an appliance supply hose or pressure regulator that is connected to an outlet valve on the gas cylinder. Standardized outlet valves are employed for gas cylinders, and appliance end fittings are designed to be compatible with these standardized outlets.

A gas cylinder assembly typically includes a gas cylinder and an cylindrical or annular outlet fitting. These outlet fittings usually incorporate a number of safety features, including a pressure relief valve, a manual shutoff valve operated by a hand wheel, and an automatic shutoff located inside an annular collar forming an outlet for the cylinder assembly. Such automatic shutoff valves usually include a valve member that is biased outwardly to a normally closed position against a valve seat, with the valve member being resiliently openable by inward pressure thereon to permit gas to flow from the cylinder.

Appliance end fittings also sometimes include excess flow control valves, which automatically restrict or shut off the flow of gas from the tank when the rate of flow of gas is excessive. This can occur when a fuel line is cut, for example, in order to prevent excess fuel from escaping. Excess flow control valves and thermal shutoff valves typically are separate valves.

An appliance end fitting for connecting a gas operated appliance to a pressurized gas cylinder is disclosed in U.S. Pat. No. 6,895,952, issued May 24, 2005 to Bachelder, which is incorporated herein by reference, including the Figures with FIGS. 1 and 2 thereof included herein.

As shown in FIGS. 1 and 2 in '952 an appliance end fitting 40 includes a simplified interior valve that acts as both a thermal valve and an excess flow control valve. The end fitting 40 has an elongated body 54 formed in two telescoping sections, an inner section 56, and an outer section 52. A coupling nut 48 is fixed for rotation about the body 52 and for connecting the appliance gas fitting 40 to the outlet fitting 26 of the gas cylinder assembly.

An interior passage 68 extends through both sections and includes an enlarged center portion. A round ball or floating valve member 86 in the center portion is movable toward a valve seat 84 in the passage at a discharge end of the center section. A spring 88 urges the ball valve member away from the valve seat and towards the gas outlet fitting but gas flow pushes the ball valve member toward the valve seat.

The two sections 52 and 56 of the body 54 are held together by a heat activated material 94, such as fusible solder, such that a nose or nipple 64 at the forward end opens the cylinder shutoff valve when the body 40 is connected to the cylinder outlet fitting 26.

Excessive heat releases the heat activated material and causes the body sections to break apart and axially separate relative to one another, whereby the shutoff valve is permitted to close. At the same time, the stem 76 of the inner section 56 engages and closes the interior valve 86 in the end fitting.

While believed suitable for the use then described, in one aspect, the floating valve member 86 is in the form of a ball which has a tendency to bind up or get trapped in the passage, interfering with gas supply to the grill. Improvements in the field are always sought.

An object of the present invention is to provide an improved appliance end fitting for connection to a pressurized propane or LP gas cylinder equipped with a standardized threaded or quick connect fitting, the fitting having a heat activatable connection and an internal valve assembly that assures continuation of gas flow.

SUMMARY OF THE INVENTION

The present invention provides an appliance end fitting with a heat-sensitive feature for use in interconnecting a fuel source, such as a tank of pressurized gas, with a gas appliance, such as an outdoor gas grill, comprising: an elongated body having a plug telescopically fitted in a socket and a shaped passage extending between forward and rearward inlet and outlet ends of the body. The forward end of the body is connectible to a gas assembly. An annular gap is formed between the facing interior telescoping walls of the plug and socket. An O-ring of heat activatable material is disposed in the annular gap for sealing and securing the plug and the socket together.

A chamber formed in the body passage proximate the outlet end for receives a valve assembly and includes a valve seat.

The valve assembly includes a valve member comprising a cylindrical body having a forward end and a rearward end, and a spring disposed in the chamber and having opposite ends, respectively, disposed against the valve seat and the valve member whereby to bias the forward end of the valve into closing relation with a passage portion through the plug.

An annular gap is formed around the outer surface of the valve member and chamber wall for normally transmitting gas from the source.

A cup-shaped coupling nut comprising a cylindrical connector connectible to the gas assembly and an annular flange, a pair of retaining rings disposed on opposite sides of the flange and in juxtaposed relation with respective sides of the flange for connecting the flange to the body. One ring is distal to the forward end and the other ring defines a lock collar fixedly secured both to the flange and to the outer surface of the elongated body by a body of heat activatable material to prevent rotation of the nut relative to the elongated body.

Excessive heat from the gas assembly causes one or both of the O-ring and the heat activatable material to collapse such that the lock collar is released whereby the elongated body and forward end translates rearward relative to the coupling nut and away from the gas assembly, such that gas is transmitted through one or both of the annular gaps and a condition that gas is always flowing unless the gas source is turned off.

In some applications, a sleeve comprised of Delrox or like heat sensitive material is disposed proximate the rearward end face of the plug and about the valve member.

Preferably, the cylindrical valve member includes a central a nipple that projects forward from the forward end face thereof to set in the rearward outlet of the plug passage.

Preferably the valve body is comprised of a durable polymeric material, such as a Delron or other NBR, is adapted to fit in a heated area of the body and still pass gas and meter gas flow around and rearwardly in an annular gap about the valve but not through the center of the valve body.

In some applications, a pad or gasket, of suitable matter such as stainless steel is embedded in the coupling nut flange in juxtaposition with the lock collar.

These and other features, objects, and benefits of the invention will be recognized by one having ordinary skill in the art and by those who practice the invention, from the specification, the claims, and the drawing figures.

For a better understanding of the present invention, reference is made to the accompanying drawing and detailed description. In the drawing, like reference numerals refer to like parts through the several views, in which:

DETAILED DESCRIPTION OF THE INVENTION

Figure 1:
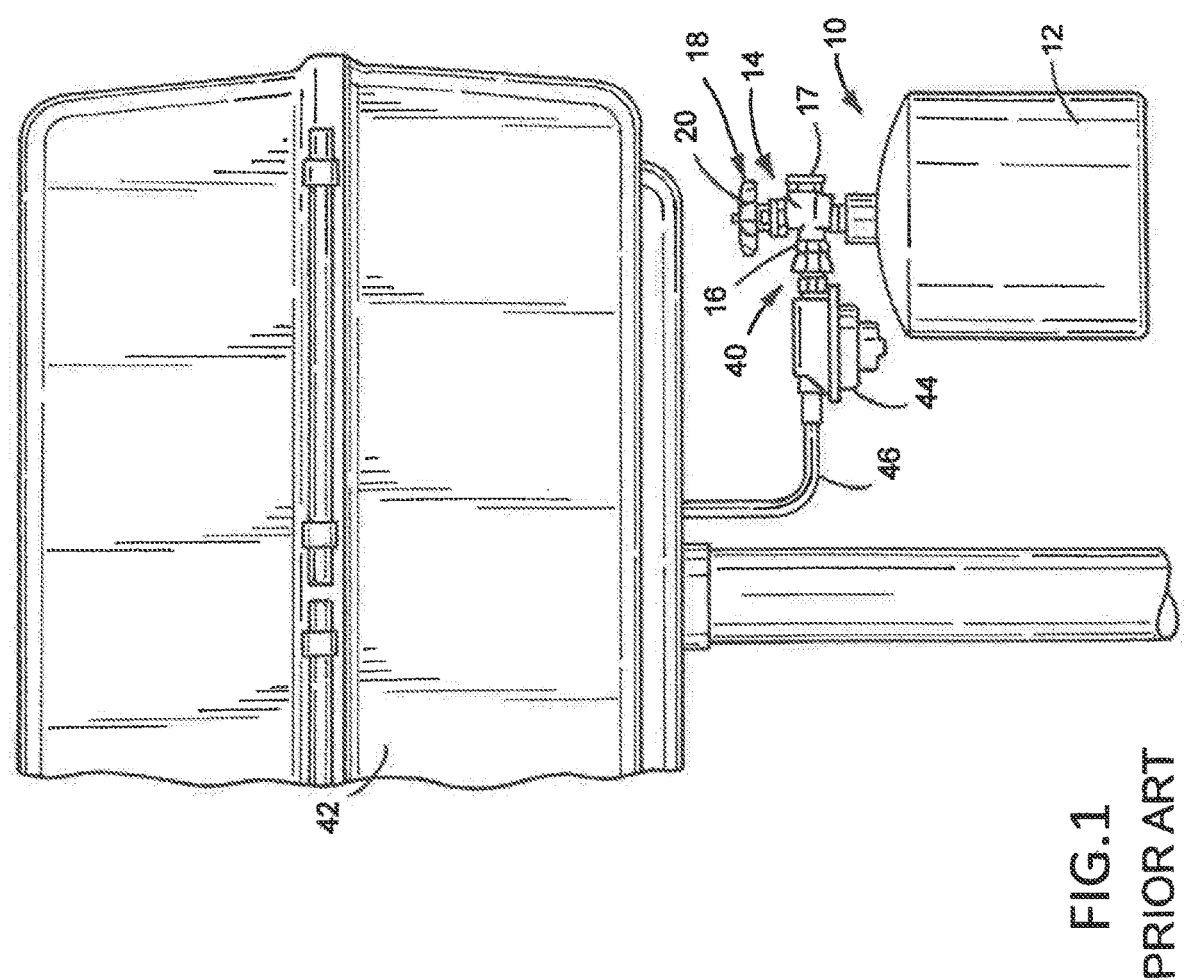
FIG. 1 is a partially schematic drawing showing a Prior Art appliance end fitting used in connecting a gas appliance such as a gas grill to the outlet of a gas cylinder assembly.
Figure 2:
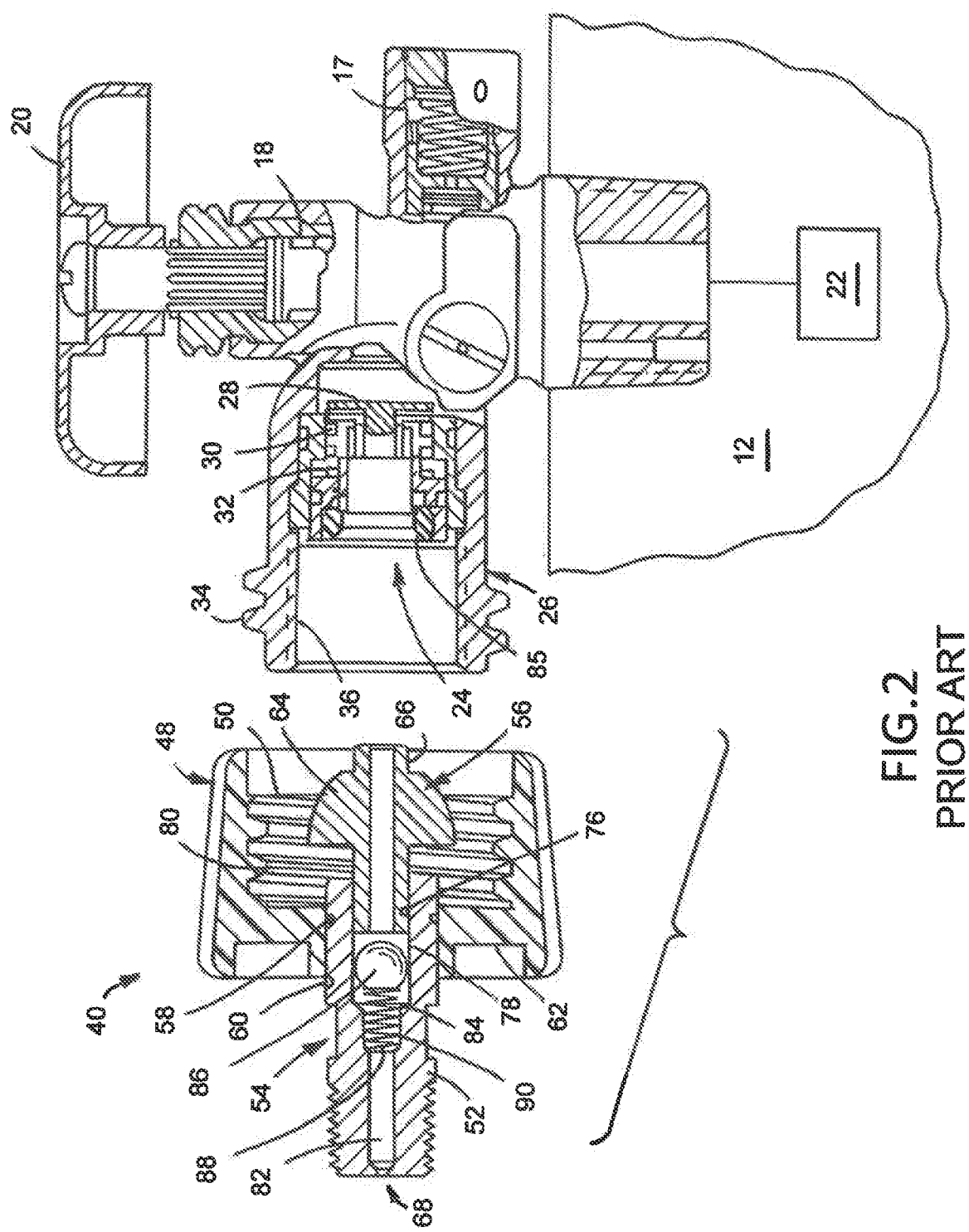
FIG. 2 is a partially sectional side elevational view showing the Prior Art appliance end fitting of FIG. 1 positioned to be connected to the outlet of a gas cylinder assembly.
Figure 3:
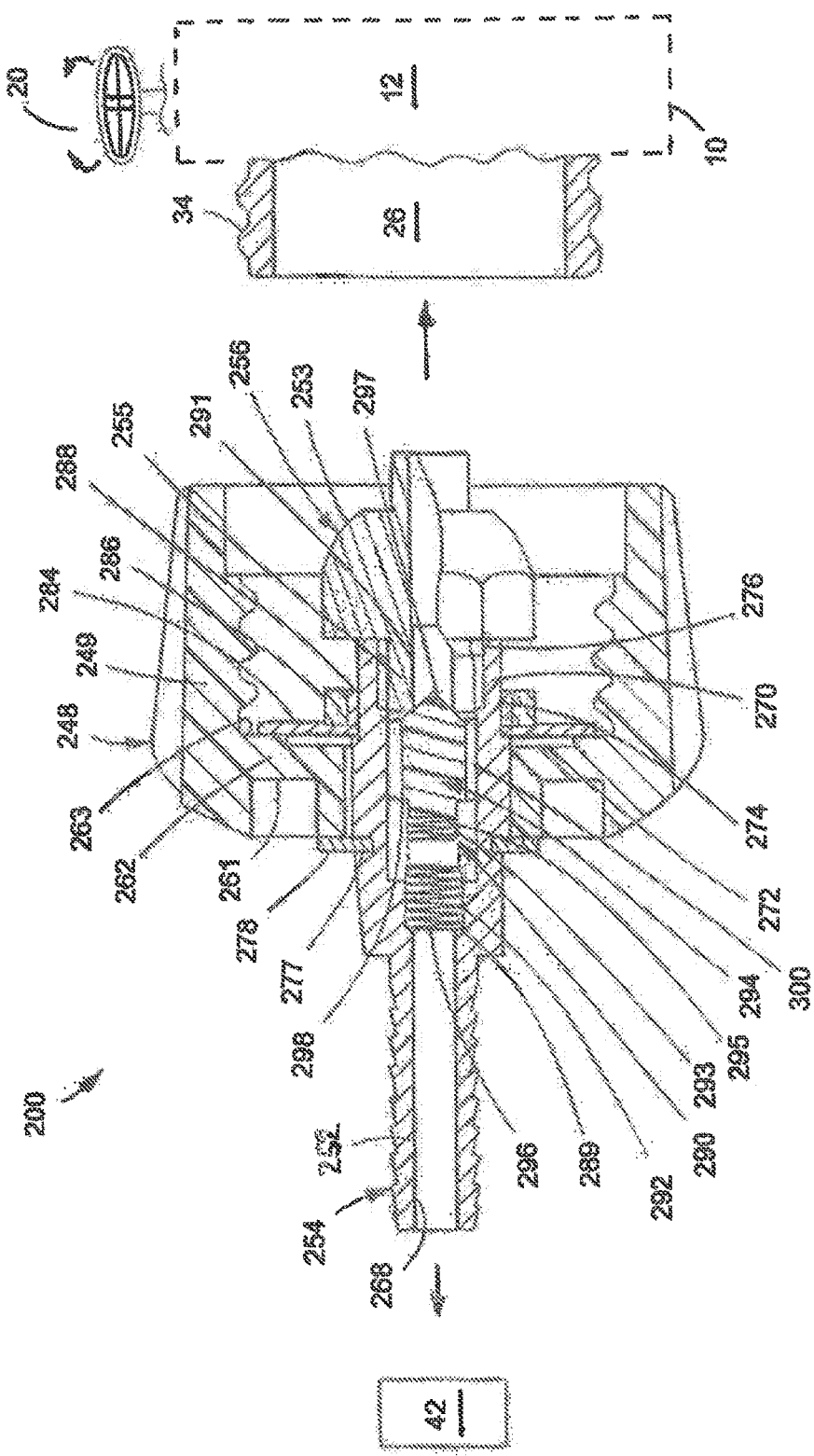
FIG. 3 is a partial sectional side elevational view showing the appliance end fitting of the present invention adapted to be positioned and be connected to the outlet of a gas cylinder assembly and inlet of a gas appliance such as a grill, as shown in FIG. 1.

In accordance with the present invention, an improved appliance end fitting 200 is adapted to attach to the outlet fitting 26 of a gas cylinder assembly 10 to supply gas therefrom to a suitable gas appliance 42, such as a propane or LP gas grill. The gas cylinder 10 and barbecue grill 42 assemblies are as discussed in the Bachelder patent and operate the same for the subject appliance end fitting 200 described herein. The prior art Bachelder part numbers are used herein for convenience.

Briefly, as before, the subject appliance end fitting 200 comprises an elongated body 254 formed by a T-shaped plug or inner member 256 of brass or other conductive material interfitted into an inlet opening at the forward end of a socket or outer member 252 formed of brass. A shaped central passage 268 extends through the elongated body 254 between the forward end of the plug 256 and the rearward end of the socket 252. The shaped passage 168 is formed by respective passage portions in the plug and socket combining to form the central passage.

A cup-shaped coupling nut 248 formed of plastic includes a coupling sleeve 249 to threadably connect to the gas outlet fitting 26 and a flange 262 to mount the nut to a medial portion of the elongated body 254.

An annular clearance or gap 270 is formed between the outer surface 272 of the plug and the inner passage surface 274 of the socket to form an opening to enable the plug 256 to fit into a forward passage portion of the socket 252. An O-ring 276 of heat sensitive material such as nitrile butyl rubber (NBR) is interference fit into the gap 270 both to seal as well as to secure the plug to the socket. The heat sensitive NBR material is subject to collapse from elevated heat received in the socket material, thereby removing the connection between the plug and socket and enabling gas transmittal through the gap 270.

Additionally, the T-shaped plug 256 includes a contoured nose 253 that mates with the gas fitting 26 and a rearward stem 255.

The coupling nut 248 and flange 262 are positioned on the elongated body by a pair of retainers connected to the body 254, A first retainer or "jump ring" 278 is preferably of C-shape and is snap fitted into an annular recess 277 in the body 254 and in juxtaposed relation with the rearward face 261 of the flange 262.

A thin flat circular donut shaped gasket 284 of stainless steel is non-rotationally fit into a complementary recess formed in the forward looking face 263 of the flange 262.

As to positioning and operational securement of the coupling nut, the other retainer ring is characterized as a circular stop collar 286 of brass that is connected to the body 254 in facing relation or juxtaposed with the gasket 284 in the flange. Importantly, a body of heat activatable material, such as solder 288, fixedly engages and secures the gasket 284, the outer body 282 and the stop collar 286 together. Because of the soldered connection of the noted parts, the coupling nut 248 and elongated body 254 rotate together as a unit when the coupling nut sleeve 249 is threadably connected to the gas outlet fitting 34.

A valve assembly 290 is fit, in part, into a chamber 292 formed in the shaped central passageway 268 at a rearward end of the socket 252. The valve assembly 290 comprises a cylindrical valve member or body 294 of NBR or like durable polymeric material having a forward end 291 and a rearward end 293, and a coil spring 296 disposed in the chamber 292, the opposite ends of the spring, respectively, disposed against a valve seat 289 in the chamber and against the rearward end 293 of the valve member 294 whereby to bias the forward end 291 of the valve member 294 into closing relation with the outlet of the passage portion through the plug 256.

An annular gap 298 is formed between and around the outer surface of the valve member 294 and the surface of the chamber wall 268 for normally transmitting gas from the source to the grill.

In one preferred embodiment, the valve member 294 has a concentric tubular stem 295 that fits into the forward end portion of the coil spring 296 to maintain stability of the fitment during back and forth movement of the valve member resulting from gas pressure and transmission of gas thereof through the passageway and a central V-shaped nose or nipple 297 protruding upwardly from the forward end face 291 of the valve member and adapted to move into closing juxtaposition with the plug outlet at the inward end of the stem 255.

Preferably in some applications a sleeve 300 of Delrox or other NBR is in the passageway 268 and in abutment with the end face of the stem 295. The valve member 294 on forward biased movement by the spring 296 is received in and encircled by the Delrox sleeve.

In operation, the subject gas end fitting 200 is connected to the propane gas supply 12 and the grill 42. Gas is turned on, such as by manual valve 20, and passes from the source 12 to the grill 42. In abnormal conditions, such as where the line to the grill is secur3ed, there is an excessive pressure build up and heat from the grill 42 will cause an excessive heat buildup in the elongated body 254, eventually reaching and melting the heat activated solder connection 288, causing the valve body 294 to move or retract rearwardly and away from the gas transmittal. In an extreme case, the heat may even cause melting of the sleeve 300 and interconnection of the plug to the socket.

Pursuant to regulations a small volume of gas will continue to flow through the elongated body, because of the retraction of the body 294 and the permitted movement of the collar 286 toward the nose 253 until turned off, such as by the manual valve 20 at the propane source 12.

The foregoing construction provides a cost effective and simplified valve assembly wherein both thermal and excessive flow protection is provided by a single valve.

As various changes could be made in the above construction without departing from the scope of the invention, it is intended that all matter contained in the above description or shown in the accompanying drawings shall be interpretive as illustrative and not in a limiting sense.

Having, thus, described the invention what is claimed is:

1. An end fitting for use in connecting in fluid communication a pair of conduits associated with an appliance and a gas source, said end fitting comprising
    a plug adapted to be connected in fluid relation with a conduit of the gas source,
    a socket body adapted to be connected in fluid relation with a conduit of the appliance, said socket body at least partially defining a socket chamber, said plug being telescopically insertable into the socket chamber,
    a first heat activatable element, said first heat activatable element fixedly joining said plug and socket body together and hold the plug, at least in part, in the socket chamber, wherein the plug and socket body combine to define a shaped central passage that extends through the plug and socket body for transmitting gas from the source to the appliance,
    a valve member in said socket chamber adapted to be normally positioned in fluid closing relation with and against the central fluid passage of said plug,
    spring means in said socket chamber for providing a force which urges said valve member into juxtaposing closing relation with the rearward outlet of the fluid passage of said plug,
    wherein an annular gap is formed between said valve member and the inner wall of said central passage of said socket at a location proximate to the rearward end of the plug,
    a coupling nut on said socket body to connect the plug and socket combination in fluid communication to the conduit of said gas source, the coupling nut having a cup-shape having a flange for mounting the coupling nut to the elongated body, the flange having a back side facing away from the plug and a front side facing the plug, the coupling nut further having a coupling sleeve for threadably connecting the end fitting to the gas source;
    a first retainer located proximal the back side of the flange of the coupling nut, the first retainer connected to the socket body;
    a gasket located proximal the front side of the flange of the coupling nut;
    a stop collar juxtaposed the gasket on the socket body, and
    wherein the gasket and the stop collar are coupled to the socket body by a second activatable yet heat fusible element, said heat fusible element fixedly mounting said coupling nut on said socket body and to position said plug against the outlet from said gas source, said second heat fusible element being deformable and meltable upon exposure to excessive heat conducted through the body of said socket to release the combination assembly of said socket body and plug from connection with the coupling nut and enable the gas source to effect relative movement of said plug and socket combination and against the influence of said spring means and allowing a predetermined amount of gas to flow through said plug and then through said annular gap.

2. The end fitting as recited in claim 1, wherein said plug is T-shaped and includes a shaped forward end portion adapted to seat against the gas conduit of said gas source, a rearward end portion telescopically disposed in said socket chamber, and a central passage therethrough for transmitting gas from the gas source into and through the socket.

3. The end fitting as recited in claim 1, wherein said heat fusible material comprises solder.

4. The end fitting as recited in claim 3, wherein said heat fusible element comprises a substantially continuous band that is adhered around and to each said socket body and coupling nut.

5. The end fitting as recited in claim 3, wherein said heat fusible element is solder.

6. The end fitting as recited in claim 1, wherein said second heat activatable element is formed as an O-ring to frictionally hold mating portions of the plug and socket together.

7. The end fitting as recited in claim 1, wherein said heat activatable elements have a generally cylindrical configuration.

8. A coupling for use in connecting a gas source in fluid communication to an appliance, said coupling comprising a coupling assembly comprising a plug adapted to be connected with said gas source, a socket body adapted to be connected with said appliance, and heat activatable retaining means for connecting the plug to the socket, said socket body at least partially defining a socket chamber, said plug being insertable into the socket chamber, and said connected plug and socket forming a fluid passage therethrough, a spring biased valve in said socket for selectively opening and closing the plug to gas flow, a coupling nut on the socket body to connect the coupling assembly of said plug and socket to said gas source, the coupling nut having a cup-shape having a flange for mounting the coupling nut to the elongated body, the flange having a back side facing away from the plug and a front side facing the plug, the coupling nut further having a coupling sleeve;
    a first retainer located proximal the back side of the flange of the coupling nut, the first retainer connected to the socket body;
    a gasket located proximal the front side of the flange of the coupling nut;
    a stop collar juxtaposed the gasket on the socket body, and
    wherein the gasket and the stop collar are coupled to the socket body by a heat fusible retaining element mounted on said socket body for releasably connecting the coupling nut to said connector assembly, said retaining element being fusible and deformable upon exposure to excessive heat in said socket body to release said assembly for movement against the influence of said spring and permit a continuous flow of gas in an annular gap formed in said chamber between said valve a chamber wall.

9. The coupling as recited in claim 8, wherein said heat fusible retaining element is a heat activatable solder.

\* \* \* \* \*